May 4, 1965 O. J. BULLINGER 3,181,245
VEHICLE BALL JOINT TESTING GAUGE
Filed Aug. 20, 1963 2 Sheets-Sheet 1
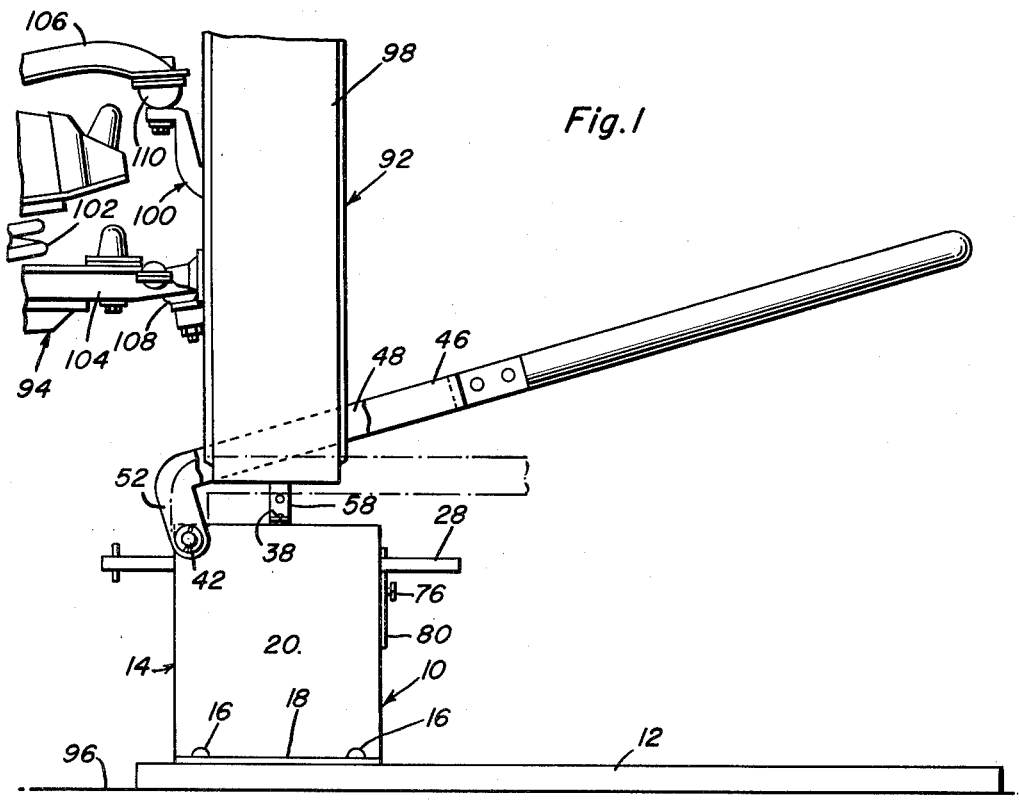
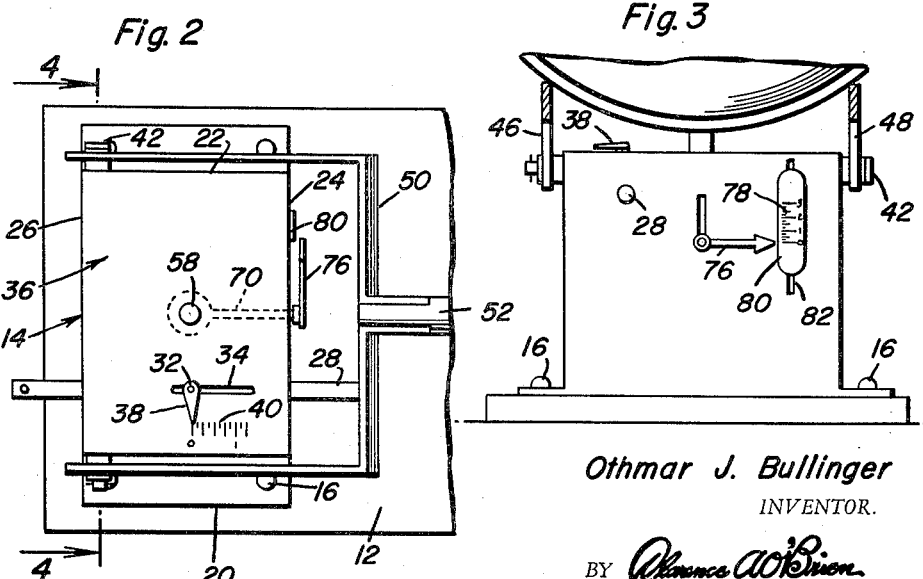
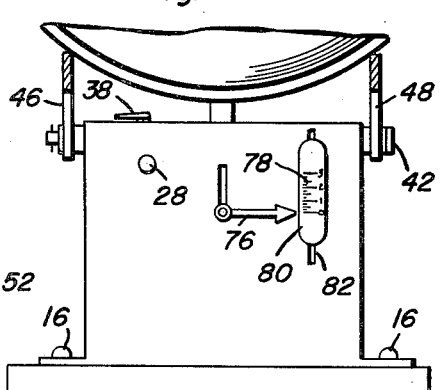
Othmar J. Bullinger
INVENTOR.

May 4, 1965  O. J. BULLINGER  3,181,245
VEHICLE BALL JOINT TESTING GAUGE
Filed Aug. 20, 1963  2 Sheets-Sheet 2
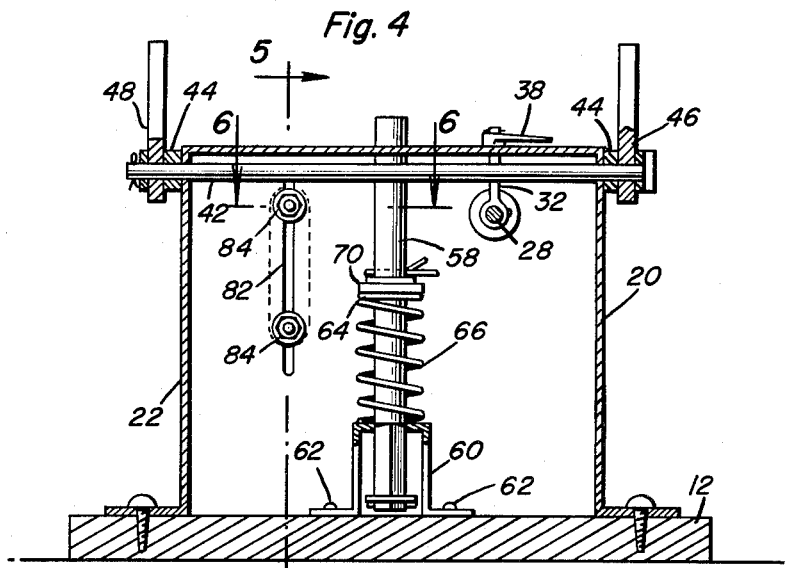
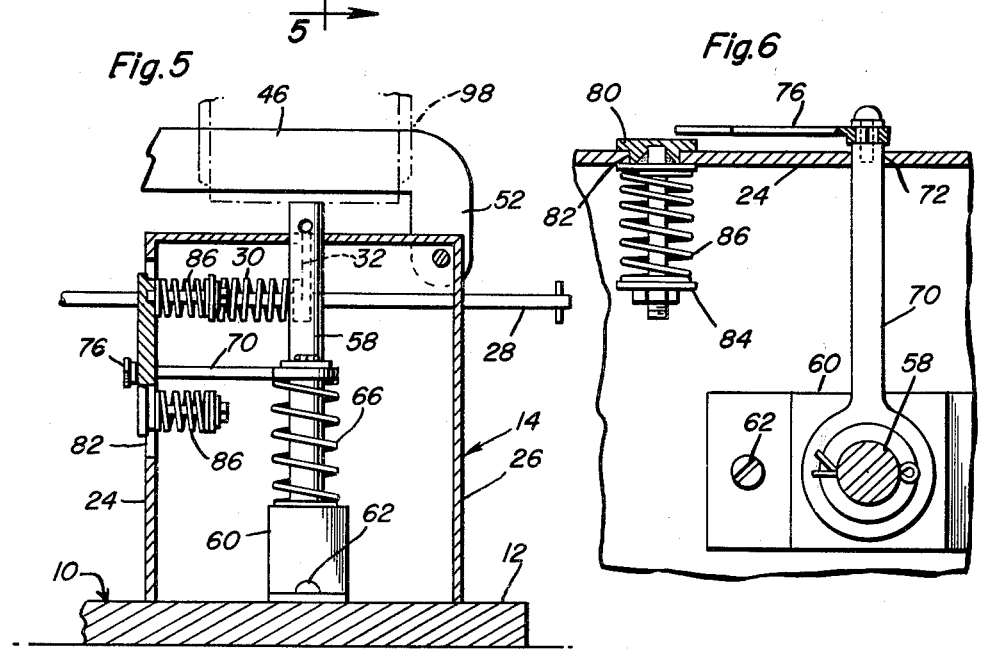
Othmar J. Bullinger
INVENTOR.
BY Clarence A. O'Brien
and Harvey B. Jackson
Attorneys

United States Patent Office 3,181,245
Patented May 4, 1965

3,181,245
VEHICLE BALL JOINT TESTING GAUGE
Othmar J. Bullinger, 727 Suter St., Johnstown, Pa.
Filed Aug. 20, 1963, Ser. No. 303,343
7 Claims. (Cl. 33—169)

This invention relates to a novel and useful ball joint testing gauge, and more specifically to a ball joint testing gauge comprising an improvement over my prior U.S. Patent No. 2,589,770 for a Device for Measuring Front-Wheel Play.

The device disclosed in my prior patent is specifically adapted to masure the "looseness" of the steering wheels of motor vehicles and in particular the steering wheels supported for movement about an upstanding axis by means of a conventional kingpin and bushing assembly.

The improvement of the instant invention over my prior device resides in the modification of the prior device in a manner such that it will also be adapted to measure the "looseness" of the steering wheels of motor vehicles which are supported for oscillation about an upstanding axis by means of ball joint assemblies.

A large percentage of the motor vehicles being presently produced in this country are provided with ball joint assemblies for mounting the front wheels of the vehicle for oscillation about upstanding axes. These ball joint assemblies are supported from the outer ends of the upper and lower control arms of the vehicle front wheel suspension assembly and are secured to suitable mounting portions carried by the spindle assemblies for the steerable front wheels of the vehicle.

When a vehicle equipped with a ball joint type of front wheel suspension assembly is driven over rough roads, the ball portions thereof are repeatedly driven into tight seated engagement in their corresponding socket portions. Inasmuch as the ball portions are usually solid in construction, they offer a greater amount of resistance to being deformed and accordingly it is the socket portions of the ball joint assemblies which are deformed.

After operation of a vehicle provided with ball joint front wheel suspension assemblies for a indeterminate length of time sufficient to cause an enlargement of the socket portions of the ball joint suspension assemblies, considerable "play" exists between the front wheel spindle assemblies of the vehicle and the upper and lower control arms by which the front wheel spindle is supported. This "play" or looseness can result in the caster and/or the camber of the front wheel suspension assembly being effected and in numerous instances allows the spindle assemblies, with the front wheels journaled thereon, to "shimmy." These malfunctions of a front wheel suspension assembly are of course deterimental and are most undesirable.

To date, the only way of testing the tightness of the fit of the ball portions within their corresponding socket portions is to jack-up the front portion of a vehicle in order that the front wheels thereof will be suspended above the ground. Then, a block or suitable fulcrum forming member is placed adjacent one of the raised front wheels of the vehicle and a "pry-bar" is utilized in the manner of a lever to exert an upward force on the wheel of the raised front wheel assembly. If there is looseness between the spindle assembly and the ends of the upper and lower control arms due to an enlarged socket portion of the front wheel suspension assembly, the front wheel, together with the spindle assembly, may be raised relative to the control arms by the use of this pry bar, the conventional springing of the front wheel assembly being sufficient to maintain the outer ends of the upper and lower control arms at their lowest point of travel while the spindle assembly is being rocked up and down.

A mechanic testing the fit of the ball portions within the corresponding socket portions of a ball joint suspension assembly then has to judge by "feel" as to whether or not maintenance should be performed on the ball joint suspension assemblies.

It is accordingly a main object of this invention to provide a vehicle ball joint testing gauge which will be capable of performing the above-mentioned function but in a manner whereby an accurate gauge reading of the "play" in the ball joint assemblies may be given. In this manner, if the looseness of the ball joint assembly falls within a predetermined range, the mechanic may be relatively sure that his determination of there not being sufficient play to warrant the replacement of the ball joint assemblies is correct. However, if the gauge indication of the looseness of the ball joint assemblies exceeds a given amount, the mechanic is also relatively sure in his determination that the effected ball joint assemblies should be replaced.

Another object of this invention is to provide a vehicle ball joint testing gauge in accordance with the preceding object which may be readily incorporated into the manufacture of and comprise an improvement over the front-wheel play measuring device of my above prior patent.

A final object of this invention to be specifically enumerated herein is to provide a vehicle ball joint testing gauge in accordance with the preceding objects which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a fragmentary and elevational view of the front portion of a vehicle showing the manner in which the vehicle ball joint testing gauge of the instant invention may be utilized to oscillate the spindle and wheel assembly of the vehicle in a manner to determine the "looseness" of the set between the ball and socket forming members of the ball joint suspension assembly;

FIGURE 2 is a fragmentary top plan view of the embodiment illustrated in FIG. 1;

FIGURE 3 is a side elevational view of the embodiment illustrated in FIGS. 1 and 2;

FIGURE 4 is an enlarged fragmentary vertical sectional view taken substantially upon the plane indicated by the section line 4—4 of FIG. 2;

FIGURE 5 is a fragmentary vertical sectional view taken substantially upon the plane indicated by the section line 5—5 of FIG. 4; and FIGURE 6 is an enlarged fragmentary horizontal sectional view taken substantially upon the plane indicated by the section line 6—6 of FIG. 4.

Referring now more specifically to the drawings, the numeral 10 generally designates the gauge of the instant invention which may be seen to include a base 12 upon which a housing generally referred to by reference numeral 14 is mounted by means of suitable fasteners formed through out-turned flanges 18 carried by the lower end walls 20 and 22 of the housing 14.

The housing 14 also includes a pair of side walls 24 and 26 and slidably supports an indicating rod 28 for longitudinal reciprocation through side walls 24 and 26. A compression spring 30 is utilized to yieldingly urge the rod 28 to a rest position and a pointer 32 is carried by the rod 28, slidably received in a slot 34 formed in the top wall 36 of the housing 14, and includes a laterally directed end portion 38 disposed outwardly of the housing 14 which may be registered with indicia 40 formed in the top wall 36.

The above foregoing specific description of the gauge 10 relates to the structural features of the instant invention which are also common to the invention disclosed in my above mentioned prior patent.

The improvement of the instant invention over my prior patent resides in the provision of a pivot shaft 42 which extends between the walls 20 and 22 and projects outwardly of the latter. The pivot shaft 42 is provided with a pair of spacers 44 and the free ends of the furcations 46 and 48 of the bifurcated end 50 of the handle lever 52 are secured to the opposite ends of the pivot shaft 42 and thus for oscillatory swinging movement between the two positions illustrated in phantom and solid lines in FIG. 1 of the drawings. The furcations 46 and 48 include down turned end portions 54 through which the opposite ends of the pivot shaft 42 project.

A feeler rod 58 is provided and is mounted from the base 12 for vertical longitudinal reciprocal movement by means of a support 60 secured to the base 12 within the housing 14 by means of fasteners 62. The feeler rod 58 includes an abutment 64 and a compression spring 66 is disposed about the feeler rod 58 between the abutment 64 and the mount 60 yieldingly urging the feeler rod 58 to an uppermost rest position.

A pointer arm 70 is secured at one end to the feeler rod 58 above the abutment 64 and the other end of the pointer arm 70 projects outwardly through a slot 72 formed in the wall 24 and is provided with a laterally directed pointer element 76 which may be registered with the indicia 78 formed on a scale plate 80. The scale plate 80 is mounted for vertical reciprocation in a slot 82 formed in the wall 24 and the plate 80 includes a pair of inwardly projecting studs having abutments 84 on their inner most ends and which are slidingly received through the slot 82. A pair of compression springs 86 are disposed between confronting surfaces of the abutments 84 and the wall 24 and serve to frictionally retain the scale plate 80 in adjusted position longitudinally of the slot 82.

In operation, the testing gauge 10 is placed beneath the vehicle wheel assembly 92 which is to be tested after the vehicle generally referred to by the reference numeral 94, of which the wheel assembly 92 comprises a part, has been raised a sufficient distance from the floor 96 to suspend the wheel assembly 92 above the floor 96. With the wheel assembly 92, including the wheel 98 and the spindle assembly 100, thus suspended, the spring 102 urges a downward force on the outer end of the lower control arm 104 and thus also pulls down the outer end of the upper control arm 106. The ball joint assemblies 108 and 110 are utilized to secure the spindle 100 to the lower and upper control arms 104 and 106 and with the gauge 10 placed beneath the wheel 98 and at a height wherein the wheel 98 urges the feeler rod 58 downwardly from its uppermost position, the lever handle 52 may be swung about its axis of rotation to bring the furcations 46 and 48 upwardly into engagement with the lower peripheral portions of the wheel 98 after the adjustable scale plate 78 is moved to a position with the pointer element 76 registered with zero. As soon as sufficient upward force has been effected by the furcations 46 and 48 to lift the wheel assembly 92, the upward movement of the wheel assembly 92 relative to the upper and lower control arms 106 and 104 may be noted on the scale plate 80. Then, as the wheel assembly 92 is raised, movement of the pointer 76 may be noted and accurate measurement of the looseness of the fit between the ball and socket portions of the ball joint assemblies 108 and 110 may be accurately determined in order that an opinion as to whether or not to replace the ball joint assemblies 108 and 110 may be based upon the true amount of looseness in the ball joint assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle ball joint testing gauge comprising a base, an indicator, means movably supporting said indicator from said base for movement of at least a portion thereof vertically relative to said base, said portion being adapted to engage the lower portion of a raised vehicle wheel, and force means movably supported from said base for movement of at least a portion thereof relative to said base in a vertical plane adjacent but spaced from the path of movement of said indicator, said force means including means, on said portion thereof, adapted to engage the lower periphery of said vehicle wheel adjacent said portion of said indicator and to raise the wheel relative to said base whereby the vertical movement of said wheel may be registered by said indicator.

2. The combination of claim 1 wherein said means movably mounting said indicator from said base includes means establishing a limit of its movement in one direction to raise said portion thereof, and means connected between said base and said indicator yieldingly urging said indicator in said one direction.

3. The combination of claim 1 wherein said force means comprises a lever arm pivotally supported from said base for rotation about a generally horizontally disposed axis extending transversely of said lever arm, said portion of said lever arm being spaced longitudinally thereof from said axis.

4. The combination of claim 3 wherein the pivoted end of said lever is bifurcated and its axis of rotation extends between the furcations thereof, said furcations being disposed on opposite sides of said indicator and comprising said portion of said force means.

5. The combination of claim 1 wherein said indicator includes a pointer movable therewith and said base includes indicia with which said pointer is registered.

6. The combination of claim 1 wherein said means movably mounting said indicator from said base includes means establishing a limit of its movement in one direction to raise said portion thereof, and means connected between said base and said indicator yieldingly urging said indicator in said one direction, said force means comprising a lever arm pivotally supported from said base for rotation about a generally horizontally disposed axis extending transversely of said lever arm, said portion of said lever arm being spaced longitudinally thereof from said axis.

7. The combination of claim 6 wherein the pivoted end of said lever is bifurcated and its axis of rotation extends between the furcations thereof, said furcations being disposed on opposite sides of said indicator and comprising said portion of said force means.

No references cited.

ISAAC LISANN, *Primary Examiner.*